US012682012B2

(12) United States Patent (10) Patent No.: US 12,682,012 B2
Jakobsen et al. (45) Date of Patent: *Jul. 14, 2026

(54) EVALUATION DEVICE FOR RE-IDENTIFICATION AND CORRESPONDING METHOD, SYSTEM AND COMPUTER PROGRAM

(71) Applicant: Grazper Technologies ApS, Copenhagen K (DK)

(72) Inventors: Thomas Jakobsen, Copenhagen K (DK); David Guldbrandsen, Copenhagen K (DK); Max La Cour Christensen, Copenhagen K (DK); Ulrik Ishoej Soendergaard, Copenhagen K (DK)

(73) Assignee: Grazper Technologies ApS, Copenhagen K (DK)

( * ) Notice: Subject to any disclaimer, the term of this patent is extended or adjusted under 35 U.S.C. 154(b) by 177 days.

This patent is subject to a terminal disclaimer.

(21) Appl. No.: 18/800,540

(22) Filed: Aug. 12, 2024

(65) Prior Publication Data

US 2024/0403388 A1 Dec. 5, 2024

Related U.S. Application Data

(63) Continuation of application No. 17/446,173, filed on Aug. 27, 2021, now Pat. No. 12,061,674.

(30) Foreign Application Priority Data

Sep. 22, 2020 (EP) ..................................... 20197546

(51) Int. Cl.
*G06F 18/22* (2023.01)
*G06V 20/40* (2022.01)

(52) U.S. Cl.
CPC .............. *G06F 18/22* (2023.01); *G06V 20/40* (2022.01); *G06V 20/48* (2022.01)

(58) Field of Classification Search
CPC ........ G06V 20/52; G06V 20/40; G06V 10/48; G06V 10/74; G06V 10/75; G06V 10/764;
(Continued)

(56) References Cited

PUBLICATIONS

Guan'an Wang et al.: Faster Person Re-Identification, Arxiv. Org, Cornell University Library, 201 Olin Library Cornell University Ithaca, NY (Year: 2020).*

(Continued)

*Primary Examiner* — Michael J Vanchy, Jr.
(74) *Attorney, Agent, or Firm* — Sughrue Mion, PLLC

(57) ABSTRACT

Examples relate to an evaluation device for re-identification and to a corresponding method, system and computer program. The evaluation device comprises processing circuitry being configured to obtain a plurality of transformed re-identification codes, each transformed re-identification code being associated with a timestamp and location information. Each transformed re-identification code is based on a similarity-preserving transformation of a re-identification code that represents at least a portion of a sample of media data, the media data originating from two or more different sources located in two or more different locations. The processing circuitry is configured to match transformed re-identification codes among the plurality of transformed re-identification codes using a similarity metric to generate one or more tuples of transformed re-identification codes that are similar according to the similarity metric. The processing circuitry is configured to determine one or more sequences of locations associated with the transformed re-identification codes of the one or more tuples of transformed re-identification codes based on the timestamps and location information associated with the transformed re- (Continued)

identification codes of the respective tuple. The processing circuitry is configured to provide information on the one or more sequences of locations.

5 Claims, 5 Drawing Sheets

(58) Field of Classification Search
CPC ...... G06V 10/774; G06V 20/48; G06V 20/59; G06V 40/16; G06V 40/172; G06F 18/22; G06F 16/71; G06F 16/784; G06F 16/787; G06F 18/214; G06F 18/2413; G06F 21/602; G06N 20/00; G06Q 50/30; G06T 9/00; G07C 9/32; H04L 9/0643; H04L 9/0662; H04L 9/0872; H04L 9/0894; H04W 12/00; H04W 12/02
See application file for complete search history.

(56) References Cited

PUBLICATIONS

Mang Ye et al., "Deep Learning for Person Re-identification: A Survey and Outlook", arXiv:2001.04193 [cs.CV] (Jan. 13, 2020), https://arxiv.org/abs/2001.04193.

* cited by examiner

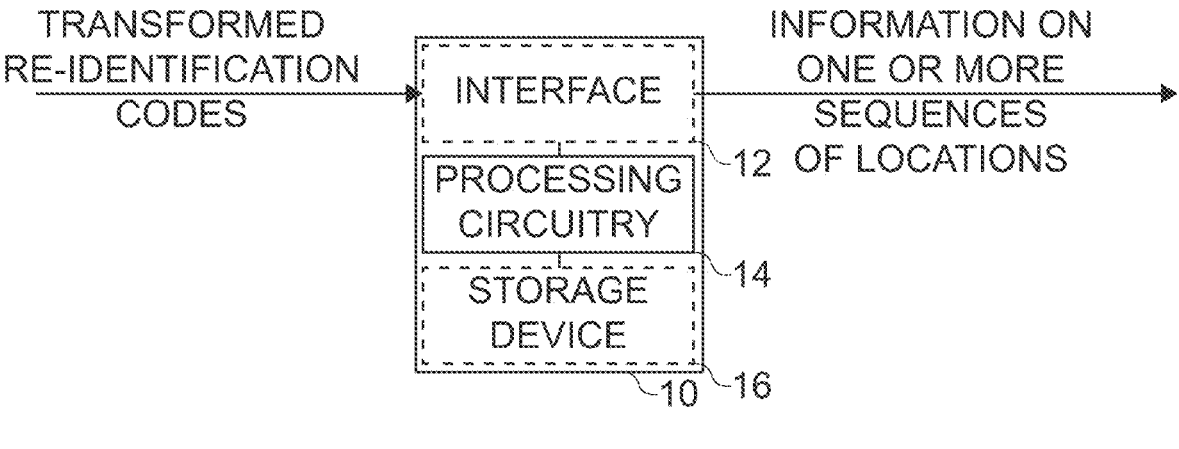

TRANSFORMED
RE-IDENTIFICATION
CODES

INTERFACE

PROCESSING
CIRCUITRY

STORAGE
DEVICE

INFORMATION ON
ONE OR MORE
SEQUENCES
OF LOCATIONS

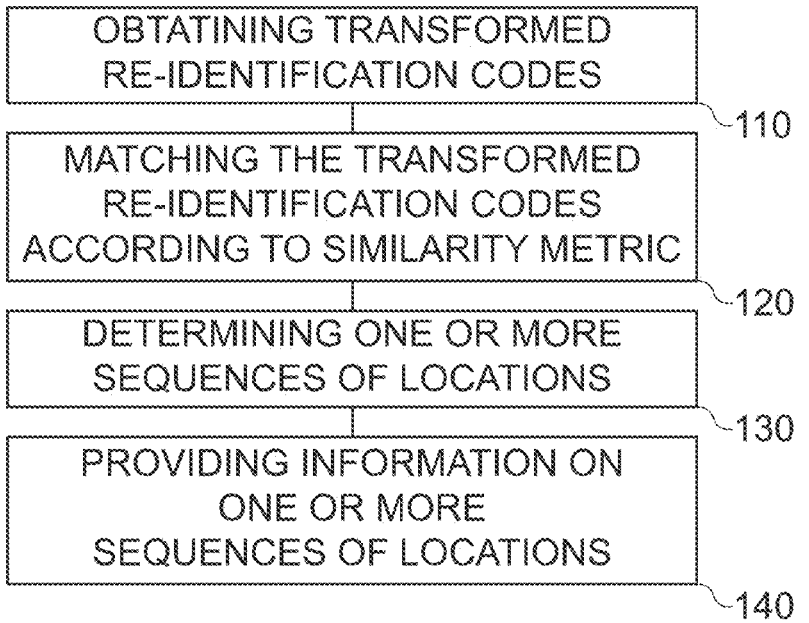

OBTATINING TRANSFORMED
RE-IDENTIFICATION CODES

110

MATCHING THE TRANSFORMED
RE-IDENTIFICATION CODES
ACCORDING TO SIMILARITY METRIC

120

DETERMINING ONE OR MORE
SEQUENCES OF LOCATIONS

130

PROVIDING INFORMATION ON
ONE OR MORE
SEQUENCES OF LOCATIONS

Anonymized Store Statistics

160 ⬈ Number of unique store visitors today: 77

Median length of stay: 13 minutes

EVALUATION DEVICE FOR RE-IDENTIFICATION AND CORRESPONDING METHOD, SYSTEM AND COMPUTER PROGRAM

CROSS-REFERENCE TO RELATED APPLICATION

This application is a continuation of U.S. patent application Ser. No. 17/446,173, filed on Aug. 27, 2021. That application claimed priority to European Application 20197546.3, filed on Sep. 22, 2020. The contents of these earlier filed applications are incorporated by reference herein in their entirety.

FIELD

Examples relate to an evaluation device for re-identification (short form: re-id) and to a corresponding method, system and computer program.

BACKGROUND

Many methods for visual tracking of persons rely on specialized cameras with overlapping fields of view, e.g., using proprietary stereovision sensors. However, specialized cameras are usually required for this approach, and tracking between cameras with non-overlapping fields of view may not be supported. Furthermore, these approaches may only support downwards-pointing camera orientations in a limited height range. Another approach to the tracking of persons is based on using Bluetooth or Wi-Fi to track the mobile phones of the persons. Another approach is the use of infrared light barriers.

SUMMARY

Various examples of the present disclosure are based on the finding, that re-identification systems, which generally do not track the identity of the person (or object) being recorded, may be used to track a movement of the person or object across locations in a closed system with multiple, non-overlapping cameras. Visual person re-identification systems serve the purpose of distinguishing or re-identifying people, from their appearance alone, in contrast to identification systems that seek to establish the absolute identity of a person (usually from facial features). For example, the use of re-identification in a system may stem from the lack of a priori knowledge of the actual identity of all persons involved, but the use of re-identification may also be due to externally enforced privacy policies. The tracking of persons (or objects) can be done by generating so-called re-identification codes from the images that represent the person that is perceptible within the images. In re-identification systems, for a given person, these re-identification codes should be similar across multiple images being taken across multiple locations, enabling an evaluation device to trace the sequence of locations that the person has visited.

Another finding is that some re-identification systems may be retroactively abused if a given re-identification code is linked to an absolute identity of a person and that re-identification code remains the same across time and/or locations. Additional effort may thus be required to securely store and transmit the re-identification codes, e.g., using a strongly guarded and closed system, which may lead to additional implementation complexities, especially in systems with many cameras, where the re-identification codes are transmitted to a central server for re-identification. The re-identification codes may also be stored for purposes of future analysis. This additional effort may be avoided if known re-identification codes are not used directly, but instead transformed re-identification codes are used, which are based on a transformation function that can change over time and/or across locations. These transformed re-identification codes are still suitable for re-identification, and also for tracing the sequence of locations visited by a person (or object), but the danger that lies in a retroactive identification of the person may be avoided, as the transformation codes being generated may be designed to become dissimilar across time and/or location.

Various aspects of the present disclosure relate to an evaluation device for re-identification. The evaluation device comprises processing circuitry configured to obtain a plurality of transformed re-identification codes. Each transformed re-identification code is associated with a timestamp and location information. Each transformed re-identification code is based on a similarity-preserving transformation of a re-identification code that represents at least a portion of a sample of media data. The media data originates from two or more different sources located in two or more different locations. The processing circuitry is configured to match transformed re-identification codes among the plurality of transformed re-identification codes using a similarity metric to generate one or more tuples of transformed re-identification codes that are similar according to the similarity metric. The processing circuitry is configured to determine one or more sequences of locations associated with the transformed re-identification codes of the one or more tuples of transformed re-identification codes based on the timestamps and location information associated with the transformed re-identification codes of the respective tuple. The processing circuitry is configured to provide information on the one or more sequences of locations. By using transformed re-identification codes, a retroactive identification of a person may be thwarted, enabling a transmission, processing and storage of the re-identification codes in environments with less stringent security requirements. In an alternative example, the proposed concept may also be implemented directly with re-identification codes that have not been transformed by a similarity-preserving transformation function. In this case, the storage and/or transmission of the re-identification codes may use additional safeguards. By grouping the re-identification codes according to the similarity metric, a path (e.g., of a person, animal, or object) across locations may be determined, and thus, a corresponding sequence may be generated.

For example, each re-identification code and corresponding transformed re-identification code may represent a person or object that is perceptible in the sample of media data. In other words, the proposed evaluation device may be used to track a movement of persons in a large space, such as an airport, or a store, or a movement of objects, such as vehicles, e.g., at complex intersections.

In general, the proposed approach may be used to derive patterns and statistical information from the movement of the persons or objects, e.g., to track a mean time required to arrive at a gate in an airport, or to estimate an additional time required in traffic. One major factor in such statistics or patterns is the time spent to visit the sequence of locations. Accordingly, the processing circuitry may be configured to determine information on time spans associated with the one or more sequences of locations based on the timestamps associated with the transformed re-identification codes of the one or more tuples of transformed re-identification codes.

In some scenarios, the proposed concept may be used in spaces where both the entrance or entrances and the exit or exits are covered by the two or more different sources. In such scenarios, the proposed system may be used to track the entire presence of the persons or objects being represented by the transformed re-identification codes. For example, the two or more different locations may be part of a delimited space. The two or more different locations may cover at least an entrance and an exit of the delimited space.

In the present disclosure, the proposed concept is presented mainly in the context of visual person re-identification. Accordingly, each re-identification code and corresponding transformed re-identification code may represent a person that is perceptible in the sample of media data. However, the proposed concept may also be used for other purposes, such as object re-identification or animal re-identification. Accordingly, each re-identification code and corresponding transformed re-identification code may represent an object or animal that is perceptible in the sample of media data.

As mentioned above, the proposed concept may be used for statistical purposes, e.g., to provide information about a mean time required to visit the sequence of locations. In addition to the time, however, additional information may also be taken into account, e.g., demographic information on the persons being represented by the transformed re-identification codes. For example, each transformed re-identification code may be associated with demographic information on the person. The processing circuitry may be configured to compile statistical information related to the one or more sequences of locations and/or statistical information related to a time span associated with the one or more sequences of locations. The statistical information may be aggregated based on the demographic information. For example, persons of different demographics may choose different paths, remain at different locations, or require different amounts of time in between locations.

There are various applications of the concept, e.g., for security reasons. For example, the processing circuitry may be configured to determine a presence of one or more persons within the delimited space based on the one or more tuples of transformed re-identification codes. This information may be used to determine whether the delimited space is full (e.g., in terms of maximal persons allowed in the delimited space), or whether a person is present in the delimited space in case of a fire.

Additionally or alternatively, the processing circuitry may be configured to detect the presence of a queue of people within the delimited space based on the determined one or more sequences of locations. Queues of people may be detected to decide whether to open another counter, e.g., at a security check in an airport, or another cashier counter in a store.

In some examples, the processing circuitry may be configured to generate an alarm signal based on the determined one or more sequences of locations. For example, an alarm may be raised if a person has breached a barrier in an airport, or if a person is heading to an exit without having paid for goods that were obtained in another department.

Another application of the proposed concept lies in the search for lost persons. For example, a child may enter a delimited space, such as a store or an airport, together with a parent. Within the delimited space, the child becomes lost. As the two persons have entered the space together, the two re-identification codes may be linked together (i.e., associated with each other), and one of the re-identification codes may be used to search for the other, e.g., in video surveillance material. In other words, the processing circuitry may be configured to store an association between transformed re-identification codes representing a first person and a second person having entered the delimited space together. The processing circuitry may be configured to retrieve the transformed re-identification code representing the second person based on the transformed re-identification code of the first person and based on the stored association. The processing circuitry may be configured to locate the second person based on the retrieved transformed re-identification code of the second person.

If the exact time the two persons have entered the space is unknown, or if a person wishes to obtain all surveillance video showing them in the space, a transformed re-identification code may be generated of the person making the inquiry, and used to locate the person, and optionally the second person as well, in the video surveillance footage. For example, the processing circuitry may be configured to generate a transformed re-identification code based on further media data representing a person. The processing circuitry may be configured to locate the person within the delimited space based on the determined sequence of locations associated with the transformed re-identification codes of a tuple comprising transformed re-identification codes that are similar to the generated transformed re-identification code.

To retrieve the surveillance footage, i.e., the media data, the following task may be performed. The processing circuitry may be configured to compile the media data that the transformed re-identification codes of the tuple comprising transformed re-identification codes that are similar to the generated transformed re-identification code is based on.

In general, the proposed evaluation device may be used in a surveillance, security monitoring or in-store analytics concept. Results of the evaluation device may be presented to a user of one of these systems via a visualization, e.g., on a computer dashboard, or as part of an alert. Accordingly, the processing circuitry may be configured to generate a display signal comprising a visualization of the information on the one or more sequences of locations.

In general, the re-identification code may be transformed by the similarity-preserving transformation such that, if the re-identification code is similar to a further re-identification code according to a similarity metric, the transformed re-identification code is similar to a further transformed re-identification code being a transformed version of the further re-identification code. In other words, the transformation may be performed such, that a subsequent re-identification is not skewed, and an equivalence class preserving property is satisfied.

In various examples, the re-identification code is transformed based on a transformation parameter that is dependent on a time. For example, the transformation parameter may gradually or periodically change over time. This may thwart a misuse of the transformed re-identification code over time and/or space.

Re-identification systems may be used with various types of media. Apart from image data of persons, re-identification systems may also be applied on images of vehicles or animals, or other types of media may be used altogether. For example, the media data may be one of image data, video data, audio data, a three-dimensional representation of movement of an object and text-based media data. In various examples, re-identification codes are generated using a hashing algorithm, with the hashing algorithm being constructed such, that, if the hashing algorithm is applied on several samples of media data representing the same person, animal or object, similar re-identification codes are obtained. The above examples of types of media data can be used with a suitable re-identification system and hashing algorithm.

For example, the processing circuitry may be configured to obtain the plurality of transformed re-identification codes from the two or more camera devices. Alternatively, the processing circuitry may be configured to obtain the plurality of transformed re-identification codes from a central apparatus for generating transformed re-identification codes that is connected to multiple camera devices.

Various aspects of the present disclosure relate to a corresponding (computer-implemented) evaluation method for re-identification. The method comprises obtaining a plurality of transformed re-identification codes. Each transformed re-identification code is associated with a timestamp and location information. Each transformed re-identification code is based on a similarity-preserving transformation of a re-identification code that represents at least a portion of a sample of media data. The media data originates from two or more different sources located in two or more different locations. The method comprises matching transformed re-identification codes among the plurality of transformed re-identification codes using a similarity metric to generate one or more tuples of transformed re-identification codes that are similar according to the similarity metric. The method comprises determining one or more sequences of locations associated with the transformed re-identification codes of the one or more tuples of transformed re-identification codes based on the timestamps and location information associated with the transformed re-identification codes of the respective tuple. The method comprises providing information on the one or more sequences of locations.

Various aspects of the present disclosure relate to a computer program having a program code for performing the above-referenced method, when the computer program is executed on a computer, a processor, or a programmable hardware component.

Various aspects of the present disclosure relate to a system comprising at least one apparatus for generating transformed re-identification codes and the above-referenced evaluation device. The at least one apparatus is configured to generate the plurality of transformed re-identification codes based on the media data originating from the two or more different sources. The evaluation device is configured to provide the information on the one or more sequences of locations based on the plurality of transformed re-identification codes provided by the at least one apparatus. For example, each source may comprise a separate apparatus for generating transformed re-identification codes, or a central apparatus for generating transformed re-identification codes may be used to generate transformed re-identification codes for multiple sources.

BRIEF DESCRIPTION OF THE FIGURES

Some examples of apparatuses and/or methods will be described in the following by way of example only, and with reference to the accompanying figures, in which FIG. 1*a* shows a schematic block diagram of an example of an evaluation device for re-identification;

FIG. 1*b* shows a schematic flow chart of an example of an evaluation method for re-identification;

DETAILED DESCRIPTION

Figure 1C:
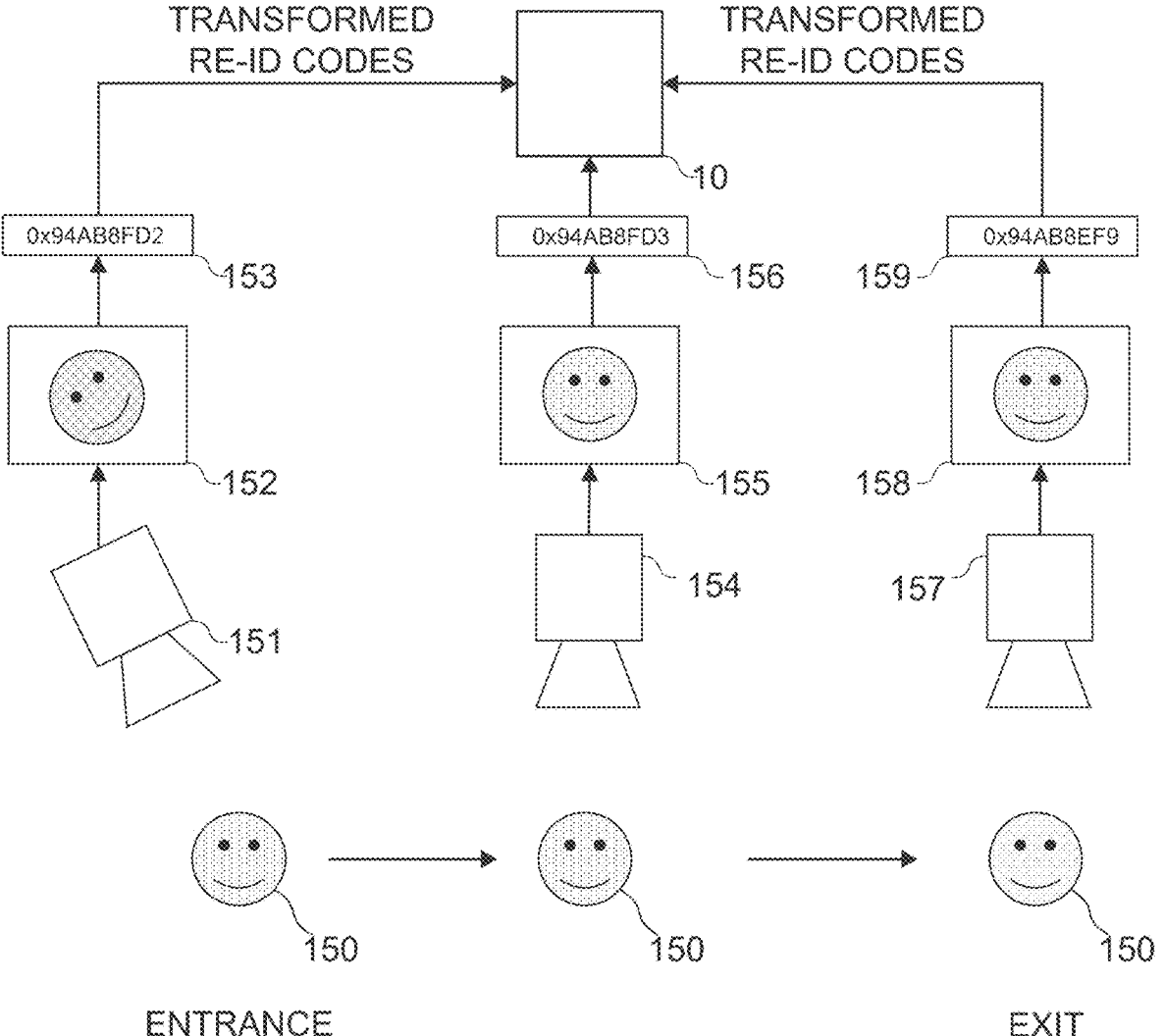
FIG. 1*c* shows a schematic diagram of a system with three cameras and an evaluation device.

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an 'or', this is to be understood as disclosing all possible combinations, i.e., only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

In the following, an example laying out a basic principle of re-identification is given. In the example, two surveillance cameras are being used. From these cameras, two images are obtained, each with a single person visible. The images may have been acquired from different angles and under different lighting conditions (or even from the same camera but at different points in time). Re-identification systems seek to infer whether the two images depict the same person or whether the images in fact show two different persons-even without knowledge of any actual identities. Furthermore, re-identification is not limited to the detection of persons in images—for example, re-identification may be performed on animals or objects, and using other types of media as well, such as three-dimensional models, text or audio.

There are multiple use cases where re-identification may be used instead of systems establishing an absolute identity, e.g., for filtering duplicate detections when counting unique visitors at a particular location during a single day, for estimating the time of travel between two distinct locations using a sensor at each endpoint, calculating the time of stay of customers at a single location, wide-area people tracking using non-overlapping cameras etc.

In some systems, re-identification is implemented by applying a hash function to each image in order to produce a so-called re-identification code. The generated hash codes represent the persons, animals or objects that are visible within the respective images, and may be compared using a similarity metric.

Various examples of the present disclosure extend the concept of re-identification codes by adding an "encryption layer" on top of the re-identification codes to generate transformed re-identification codes. The applied hash function, together with the transformation, has a so-called "equivalence class preserving" (ECP) property, which can be an isometry property or an "(almost) distance-preserving" property, as the distance between transformed re-identification codes is at least similar, if not equal, to the distance between the re-identification codes that the transformed re-identification codes are based on. The ECP property is similar to properties of locality-sensitive hashing (LSH), and is described in the following.

In mathematical terms, let $f$ be such a hash function, e an ECP-preserving transformation function (encryption function), and let $h_1=e(f(I_1))$ and $h_2=e(f(I_2))$ be the respective re-identification codes of the two images $I_1$ and $I_2$. The ECP property assures that two transformed re-identification codes are approximately similar in some suitable similarity metric, i.e., $h_1 \approx h_2$, if and only if the person on image $I_1$ is the same as the person on image $I_2$-even if the images are captured from different angles. Therefore, after evaluating the hash function on the two images, if the distance between the two re-identification codes is small, it can be concluded that the person is the same. If on the other hand, the distance is large, then, most likely, the images contain persons that are different.

Various methods can be used to implement such a system for visual re-identification. A number of systems use hand-crafted visual features (like gender, age, facial features, color of clothing, hair style, body type etc.), but in order to gain the highest accuracy possible, many approaches rely on deep learning-based techniques based on, e.g., triplet loss. The exact method used for computing the re-identification code, however, is not important for the sake of explaining the concept.

In some systems, the re-id code (short form of re-identification code) for a specific person may be identical for different days leading to potential absolute identification of individual persons. This may be due to the fact that traditional re-identification codes are consistent over time. For example, if a person has his image taken on one particular camera at a particular time $t_1$, then it may be possible to identify him at a much later time $t_2$, potentially leading to knowledge about their personal identity one of the images may have been obtained, e.g., from their passport or driving license. If re-identification is applied in such a manner, it may thus inadvertently also enable non-anonymous identification of persons. In many systems, this identification property is unwanted as it can lead to data leakage. It is not possible to use straight-forward cryptographic methods to alleviate this shortcoming by, e.g., encrypting re-identification codes without losing the required re-identification ability. Because individual devices relying on previous approaches might not offer privacy by design, such distributed systems for re-identification might keep all communication secret and store re-identification values securely, e.g., by using secure devices or communicating over secure networks. In distributed multi-camera systems with many devices communicating, this may add an additional burden to the overall system design. Furthermore, the problem might not be alleviated with traditional cryptographical methods, as almost all existing encryption methods lack the "equivalence class preserving" property due to the cryptographic avalanche effect, whereby small changes in the unencrypted data lead to large changes in the encrypted data and therefore might not maintain the re-identification ability. In other words, some methods for re-identification might not offer privacy by design.

Various examples of the present disclosure take a different approach, in which a re-identification over multiple locations or over time may be restricted by design. Examples may provide a method for anonymous re-identification and therefore allow privacy by design (by periodically or locally, efficiently and irreversibly changing the re-identification hash function). This may enable both transmitting and storing re-identification codes insecurely without violating privacy regulations, as the privacy may be conserved even if the transformed codes are stored in arbitrary storage systems without guarantees regarding privacy. The proposed concept is based on augmenting an existing (non-privacy enhanced, non-anonymous, commonly used) re-identification hash function with a transformation functionality, e.g., using additional specialized, cryptographic primitives. In contrast to traditional cryptographic schemes for secrecy, the proposed concept does not remove the ability to carry out re-identification even after encrypting the re-identification code (by maintaining the ECP property). In contrast to some other systems, the re-identification code matching can be carried out on an insecure server or even by an untrusted third party. Also, transformed re-identification codes can be stored indefinitely in untrusted databases, without sacrificing on privacy. The proposed concept may improve the concept of re-identification, as it allows existing re-identification algorithms to be enhanced with privacy by design by adding new additional primitives on top. The proposed concept may combine an existing or novel re-identification system with a (dynamic) encryption primitive (i.e., a transformation function) with the ECP property (on top of the re-identification system).

In the following, it is assumed that the system for computing and subsequently encrypting the re-identification codes is embedded into the cameras. This is not necessary for the proposed concept to work, but is useful for illustrating the use case. While the method may be useful on embedded or edge devices, it can also work on cloud-based implementations, with the subsequently presented apparatus or evaluation device being implemented in the cloud.

On top of the transformation of the re-identification codes, an evaluation device is provided, which uses the transformed re-identification code to determine a sequence of locations visited by a person, animal or object. Various aspects of the present disclosure provide an apparatus for anonymous customer analytics, e.g., using multiple non-overlapping cameras. The present disclosure presents several applications of anonymous re-identification, with in-store analytics as the primary example.

Various examples of the present disclosure are based on the use of information sources, such as cameras, that do not require stereo vision or overlapping fields of view. Through the use of re-identification, analytics are enabled across locations of a space, without having to cover the entire space. Accordingly, in various examples, existing camera installations can be used. The proposed concepts simply analyze the current feed (which can also be used for its original—or new—purposes). It is possible to use the existing camera feed for other purposes simultaneously, e.g., theft monitoring, advanced behavior analysis or demographic analysis (age/gender). Also, if cameras are being used, these cameras do not need to be specialized (e.g., stereo vision is not necessary). Also the cameras can be mounted at a wider variety of angles and wider range of heights. Through the use of anonymous re-identification based on machine learning/deep learning, existing concepts and/or installations may be improved.

In the following, it may be assumed that a functioning system for (visual) anonymous re-identification is available. Such as system is, for example, shown in connection with FIGS. 2a to 3b, where an apparatus for generating transformed re-identification codes for use in anonymous re-identification is presented, as well as a system with such an apparatus and a corresponding evaluation device, e.g., as presented in connection with FIGS. 1a to 1c.

FIG. 1a shows a schematic block diagram of an example of an evaluation device 10 for re-identification. The evaluation device comprises processing circuitry 14. Optionally, the evaluation device comprises an interface 12 and one or more storage devices 16. The processing circuitry is coupled to the optional interface and one or more storage devices. In general, the functionality of the evaluation device is provided by the processing circuitry, e.g., in conjunction with the interface (for exchanging information) and/or the one or more storage devices (for storing information).

The processing circuitry is configured to obtain a plurality of transformed re-identification codes (e.g., via the interface 12 and/or from the one or more storage devices 16). Each transformed re-identification code is associated with a time-stamp and location information. Each transformed re-identification code is based on a similarity-preserving transformation of a re-identification code that represents at least a portion of a sample of media data. The media data originates from two or more different sources located in two or more different locations. The processing circuitry is configured to match transformed re-identification codes among the plurality of transformed re-identification codes using a similarity metric to generate one or more tuples of transformed re-identification codes that are similar according to the similarity metric. The processing circuitry is configured to determine one or more sequences of locations associated with the transformed re-identification codes of the one or more tuples of transformed re-identification codes based on the timestamps and location information associated with the transformed re-identification codes of the respective tuple. The processing circuitry is configured to provide information on the one or more sequences of locations (e.g., via the interface 12).

FIG. 1b shows a schematic flow chart of an example of a corresponding (computer-implemented) evaluation method for re-identification. The method comprises obtaining 110 the plurality of transformed re-identification codes. The method comprises matching 120 transformed re-identification codes among the plurality of transformed re-identification codes using a similarity metric to generate the one or more tuples of transformed re-identification codes that are similar according to the similarity metric. The method comprises determining 130 the one or more sequences of locations associated with the transformed re-identification codes of the one or more tuples of transformed re-identification codes based on the timestamps and location information associated with the transformed re-identification codes of the respective tuple. The method comprises providing 140 the information on the one or more sequences of locations.

The following description relates both to the evaluation device 10 of FIG. 1a and to the corresponding method of FIG. 1b.

Various aspects of the present disclosure relate to an evaluation device, an evaluation method and a corresponding computer program for re-identification, i.e., for use in re-identification. In general, re-identification systems comprise multiple components-a component for generating re-identification codes, or, in various examples of the proposed concept, transformed re-identification codes, and a component for evaluating these re-identification codes, to perform the actual re-identification. In this context, the term re-identification indicates, that something, such as a person, animal or object, is re-identified (but not identified), i.e., that a person, animal or object, that has been recorded earlier, is recorded again and matched to the previous recording. In the proposed concept, the re-identification is based on so-called re-identification codes, which are codes that represent the person, animal or object being perceptible in some type of media data. In the context of the present disclosure, the main focus is on visual person re-identification system, i.e., systems, in which visual media data (e.g., image data) is recorded, and a person being visible in the visual image data is being re-identified. However, the same concept may also be applied to other types of media data, and also to animals or objects, as long as a suitable hashing function is chosen for generating the re-identification codes. For example, each re-identification code and corresponding transformed re-identification code may represent a person, animal or object that is perceptible in the sample of media data. On the other hand, a person, animal or object can be represented by a group of similar re-identification codes. Accordingly, the media data may be one of image data, video data, audio data, and a three-dimensional representation of movement of a person or object. However, in various examples, the media data itself is not analyzed by the evaluation device. Instead, the media data is being processed by the entity generating the re-identification code representing at least a portion of (e.g., a person, animal or object that is perceptible in) the media data. Accordingly, the analysis of the media data is introduced in more detail in connection with the apparatus for generating transformed re-identification codes of FIG. 2a.

The processing circuitry is configured to obtain a plurality of transformed re-identification codes. As has been pointed out above, the means for generating such transformed re-identification codes, may be provided by an apparatus for generating transformed re-identification codes, e.g., as shown in connection with FIGS. 2a to 2b. Such an apparatus may, e.g., be integrated within a camera device 200, as shown in FIG. 2b and FIG. 1c (in cameras 151; 154; 157), as shown in the following. It may accept the media data at its input, and provide the transformed re-identification codes based on the media data that is provided at the input. If such an apparatus is integrated within the camera devices, the transformed re-identification codes may be obtained (e.g., received) from the respective camera devices. Accordingly, the processing circuitry may be configured to obtain the plurality of transformed re-identification codes from two or more camera devices 200. Alternatively, a central apparatus may be used that processes media data of multiple cameras, and the plurality of transformed re-identification codes may be obtained from the central apparatus. In some examples, the evaluation device may comprise the central apparatus, e.g. the apparatus 20 for generating transformed re-identification codes shown in connection with FIGS. 2a to 2b. As has been pointed out before, the same principle may be applied to other sources as well, such as microphones or 3D sensors.

Figure 3A:
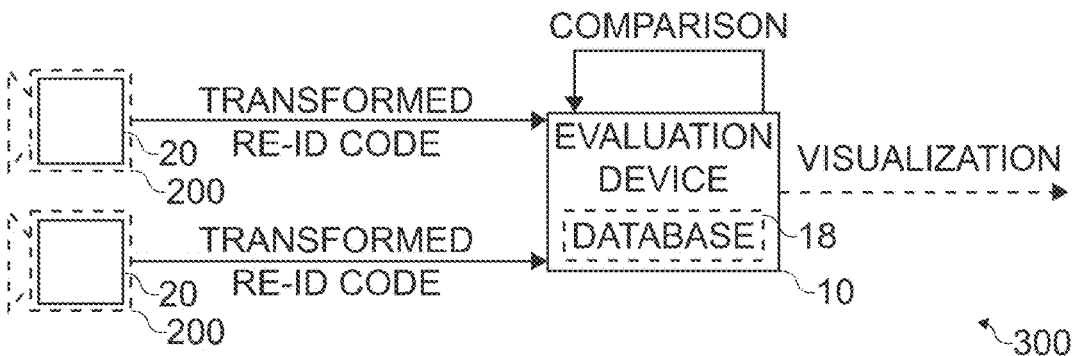
FIGS. 3*a* and 3*b* show schematic block diagrams of examples of a system comprising at least one apparatus for re-identification or at least one apparatus for generating a transformed re-identification code.

In FIG. 1c, a system is shown, in which the transformed re-identification codes are provided by the respective camera devices. FIG. 1c shows a system comprising at least one apparatus for generating transformed re-identification codes (integrated within camera devices 151, 154 and 157) and the evaluation device 10. In FIG. 1c, a person 150 moves within a space, from entrance to exit. The person is recorded by the camera devices 151; 154; 157, which generate image data 152; 155; 158 of the person, which is in turn used to generate the respective transformed re-identification codes 153; 156; 159, which are transmitted to the evaluation device 10. In other words, the at least one apparatus (i.e., the apparatuses integrated within the camera devices) may be configured to generate the plurality of transformed re-identification codes based on the media data originating from the two or more different sources (i.e., the two or more camera devices). Referring to the more concrete example of cameras, the media data may be one of image data or video data. The media data may originate from the two or more camera devices 151; 154; 157 (or 200, as shown in FIGS. 3a and/or 3b) located in two or more different locations. In this context, the term "originate" indicates, that the media data is generated by the two or more different sources. The evaluation device may be configured to provide the information on the one or more sequences of locations based on the plurality of transformed re-identification codes provided by the at least one apparatus.

In various examples, the plurality of transformed re-identification codes may be obtained from a database 18, e.g., as shown in FIGS. 3a and/or 3b. For example, the database 18 may be a database that is accessible by multiple devices via a defined interface (e.g., via a computer network and/or according to a pre-defined protocol). For example, multiple apparatuses may be configured to provide their generated transformed re-identification codes to the database. In some examples, the database may be external to the evaluation device, and e.g., accessed via a computer network. In some examples, however, the evaluation device may comprise the database 18.

As pointed out above, the re-identification codes being used in the context of the present disclosure are transformed re-identification codes, which are re-identification codes that have been transformed based on a similarity-preserving transformation of a re-identification code. In some examples, this transformation may be applied directly by the device generating the re-identification code that the transformed re-identification code is based on. Examples for the transformation are given in connection with FIGS. 2a to 2b, where an apparatus is shown that generates such transformed re-identification codes. In general, the transformation is a similarity-preserving transformation, i.e., the re-identification code is transformed by the similarity-preserving transformation such that, if the re-identification code is similar to a further re-identification code according to a similarity metric, the transformed re-identification code is similar to a further transformed re-identification code being a transformed version of the further re-identification code. As will be introduced in more detail in connection with FIGS. 2a to 2b, the re-identification code may be transformed based on a transformation parameter that is dependent on one of a time and a location. For example, the transformation parameter may gradually or periodically change over time or across locations, i.e., gradually based on a linear interpolation between two transformation parameters, or at a fixed time or position. More details can be found in connection with FIGS. 2a to 2b.

Each transformed re-identification code is associated with a timestamp and location information. In this context, the term "associated with" indicates, that the transformed re-identification codes are received together with a corresponding timestamp and location information, or that the transformed re-identification codes are annotated, by the processing circuitry, with the corresponding timestamp and location information based on their time of arrival and source. In general, the timestamp relates to a time at which the media data the respective transformed re-identification code is based on is recorded, or the time at which the respective transformed re-identification code is received (e.g., if the transformed re-identification codes are obtained substantially in real-time). Accordingly, the processing circuitry may be configured to determine the timestamp of the transformed re-identification codes based on the time the respective transformed re-identification codes are obtained. Similarly, the location information indicates the location at which the media data the respective transformed re-identification code is based on is recorded. For example, the location identifier may comprise an identifier for identifying the location (e.g., an identifier of a camera providing the media data, which is linked to an actual information by the evaluation device), or coordinates according to a coordinate system. For example, if the transformed re-identification code is obtained from a known source, e.g., an apparatus of a known camera device, the processing circuitry may be configured to determine the location information based on the source that the transformed re-identification code is obtained from.

The processing circuitry is configured to match transformed re-identification codes among the plurality of transformed re-identification codes using a similarity metric to generate one or more tuples of transformed re-identification codes that are similar according to the similarity metric. In general, a tuple is a group of values comprising zero or more elements, in an ordered fashion. In some examples, however, the order of the samples within the tuple is without meaning, as merely the adherence of a sample to a tuple may be relevant to the generation of the sequence of locations. Therefore, the described tuple may also be understood as "set" or "group" of samples. Alternatively, the order within the tuple may be defined by a chronological order according to the timestamps associated with the transformed re-identification codes. Also, each tuple may comprise one or more samples (unless a non-zero tuple had one or more samples removed).

The processing circuitry is thus configured to group together transformed re-identification codes using the similarity metric. In particular, the processing circuitry may be configured to match transformed re-identification codes that have a similarity, according to the similarity metric, that exceeds or matches a pre-defined similarity threshold. In this context, the term "matches" indicates, that the respective transformed re-identification codes are compared and similar transformed re-identification codes are grouped together to form the tuples. For example, the transformed re-identification codes may be represented as a string of hexadecimal values, as shown in FIG. 1c. The processing circuitry may be configured to compare each pair of transformed re-identification code on a digit-by-digit basis (digit meaning the individual hexadecimal values), and determine a further string of hexadecimal values composed of the differences of the individual digits. The sum of the values of the further string may then indicate the similarity between the two transformed re-identification codes—the larger the sum, the larger the overall difference is, and the lower the similarity is. Alternatively, another system is chosen, e.g., one that takes into account the entire hexadecimal value instead of evaluating the digits separately. In some examples, the difference is also denoted the "distance" between the two transformed re-identification codes. By matching the transformed re-identification codes using a similarity metric, the transformed re-identification codes may be grouped together in the one or more tuples such, that the re-identification codes being assigned to the same couple are similar according to the similarity metric.

While the obtained transformed re-identification codes are used to match similar transformed re-identification codes together, the timestamp and the location are used to establish the sequence of locations. The processing circuitry is configured to determine one or more sequences of locations associated with the transformed re-identification codes of the one or more tuples of transformed re-identification codes based on the timestamps and location information associated with the transformed re-identification codes of the respective tuple. For example, the processing circuitry may be configured to sort the transformed re-identification codes of the one or more tuples according to the associated timestamp, and generate the sequence of locations based on the location information associated with the transformed re-identification codes of the tuples, in the order defined by the associated timestamps. Alternatively, the transformed re-identification codes may already be added to the tuple in the order defined by the timestamps associated with the respective transformed re-identification codes, e.g., based on the order and time they are obtained by the evaluation device. In general, each sequence of locations may be associated with the transformed re-identification codes that were used to generate the sequence of locations, and thus also with the respective person, animal or object represented by the respective transformed re-identification codes. In short, each sequence of locations may be associated with a person, animal or object (that is represented by the transformed re-identification codes being used to generate the respective sequence of location).

Once the sequence of location is determined, it can be processed to compile knowledge about the sequence of locations, such as the time taken by the person (or object) to visit the sequence of locations. For example, in a scenario where the behavior of persons in a store, or another location, such as an airport, an oil rig, or an amusement park, is being evaluated, the time of stay in the store may be calculated, for example. In other words, the processing circuitry may be configured to determine information on time spans associated with the one or more sequences of locations based on the timestamps associated with the transformed re-identification codes of the one or more tuples of transformed re-identification codes, e.g., to determine the time spent by one or more persons (or animals, or objects) associated with the one or more sequences of locations, to visit the sequence of locations, and thus the time of stay.

The system does not only apply to retail stores, but also to airports, oil rigs, chemical plants, factory floors, companies, amusement parks etc. For security (tracking of intruders), safety (accounting for people in case of an emergency and other situations), health (e.g., number of people present in a room, which can be limited to limit the spreading of infectious diseases), smart buildings, traffic analysis for smart cities, and general analytics for architects and building owners. In general terms, the concept may be applied to any delimited (i.e., enclosed) space. In other words, the two or more different locations may be part of a delimited space. In the context of the present disclosure, a delimited space, or an enclosed space, may be defined as a space, in which the entrances and/or exits are among the two or more different locations being covered by the two or more source, e.g., the two or more cameras. Accordingly, the delimited space may also be an outdoor space, as long as the entrance(s) and exit(s) are among the two or more different locations. In other words, the two or more different locations may cover at least an (or each) entrance and an (or each) exit of the delimited space.

In general, the presented concept may be used to track a person within the delimited space, e.g., as the person passes from the entrance to the exit. If time of stay is the only statistic needed, then two cameras may suffice for each store entrance-one facing outwards and one facing inwards. The customer re-id hash (i.e., re-identification code) may be computed when entering and when exiting. Combined, this gives information about the length of stay, i.e., the time span associated with the respective sequence of locations. Accordingly, the processing circuitry may be configured to determine the length of stay of the individual persons represented by the transformed re-identification codes based on the time-span associated with the respective sequence of locations. The same approach may be used to count the number of unique visitors. This number may correspond to the number of tuples comprising a first transformed re-identification code that is based on media data that originates from an entrance of the delimited space, and a second transformed re-identification code that is based on media data that originates from an exit of the delimited space. After a person has been detected at an exit, the person may be counted as a unique visitor, and the tuple may be discarded (or, alternatively, at the end of the day).

To determine more fine-granular information on the locations visited, more than two cameras may be setup in the delimited space. For example, cameras may be be set up at strategic positions in the delimited space (e.g., retail store). All entries and exits may be covered in addition to important positions in the delimited space.

By using the anonymous re-identification concept, a person, such as a customer, can be re-identified on multiple non-overlapping cameras. If the positions of the cameras are known in advance and the time and re-id code of each customer is logged, it is then possible to recreate a plausible movement route of the customer's way through the store. Accordingly, the two or more cameras may have a non-overlapping field of view, or at least one of the two or more cameras may have a field of view that has zero overlap with any of the other of the two or more cameras. Furthermore, because the system is anonymous, it offers privacy by design and therefore does not violate privacy regulations.

Figure 1D:
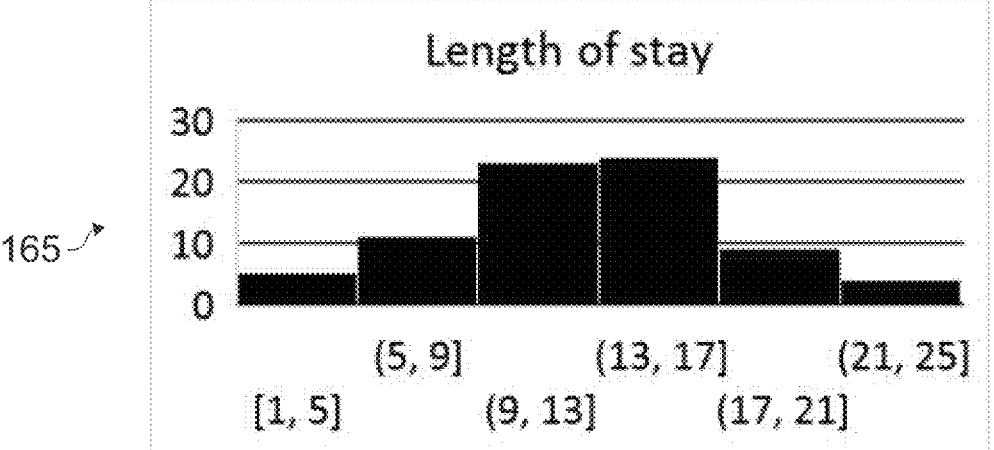
FIG. 1*d* shows an example of a visualization provided by an evaluation device.
Figure 1E:
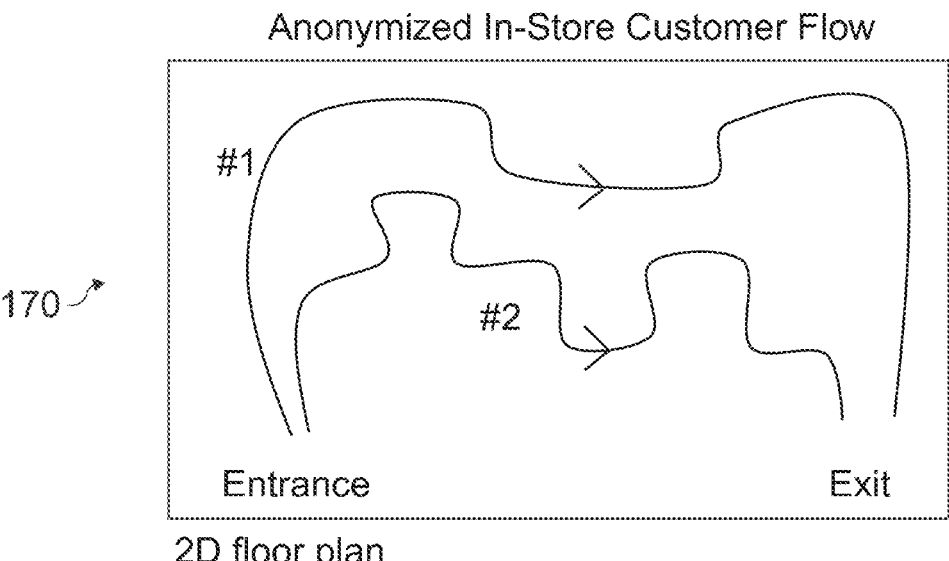
FIG. 1*e* shows another example of a visualization provided by an evaluation device.

It is possible to couple the proposed concept with image-based demographic analysis to give age or gender-based results. If, for example, coupled with age estimation, it is possible to produce histograms of the different length of stay of various age groups. In other words, each transformed re-identification code may be associated with demographic information on the person, such as (estimated) age group or (estimated) gender. For example, the transformed re-identification codes may be obtained with the associated demographic information. For example, another machine-learning based functionality, which may be provided by the apparatus providing the transformed re-identification codes, may be used to estimate the age group or gender of the person represented by the transformed re-identification codes. The processing circuitry may be configured to compile statistical information related to the one or more sequences of locations and/or statistical information related to a time span associated with the one or more sequences of locations. For example, the statistical information may comprise a histogram of time spans spent by individual persons within the delimited space (e.g., as shown in FIG. 1*d*). Alternatively or additionally, the statistical information may comprise a statistical breakdown of paths (or routes) taken by individual persons within the delimited space (e.g., as shown in FIG. 1*e*), or a statistical breakdown of aisles being visited within the delimited space (if the delimited space is a store). For example, the statistical information may be aggregated based on the demographic information. In other words, individual histograms may be generated for different age groups and/or gender within the statistical information. Also, the paths or aisles visited may be broken down by age group or gender within the statistical information.

A general system for many use cases can be created by exporting all the camera-specific, time-stamped, anonymous re-id codes to an external database. This would allow an application programmer without any image analysis or deep learning experience to create advanced applications in which customer movement can be analyzed or even used for real-time alerts like queue detection, theft alarms, emergencies and others. For example, the processing circuitry may be configured to determine a presence of one or more persons within the delimited space based on the one or more tuples of transformed re-identification codes, e.g., by identifying at least one among the tuples without a transformed re-identification code that is based on media data that originates from an exit of the delimited space. Additionally or alternatively, the processing circuitry may be configured to detect the presence of a queue of people within the delimited space based on the determined one or more sequences of locations, e.g., by identifying a plurality of tuples comprising transformed re-identification codes associated with the same location information and the same timestamp. In some examples, the processing circuitry may be configured to generate an alarm signal based on the determined one or more sequences of locations, e.g., if the presence of too many unique persons within a section of the delimited space is determined, or if a sequence of locations includes a high-value location, such as jewelry counter, and an exit, but lacks a cashier counter. Because of the anonymous re-id codes, the database may be stored with a lower level of security, while adhering to privacy laws and regulations, such as General Data Protection Regulation (GDPR).

Another specific application of the system would be tracking of lost children in an amusement park or shopping center. If for example a mother and a child arrives but the child gets lost, it would be possible first to obtain the child's re-id code using the mother's re-id code (from her driving license or by taking a photo of her), and subsequently, the child could then be tracked. In other words, the processing circuitry may be configured to store an association between transformed re-identification codes representing a first person (e.g., the mother) and a second person (e.g., the child) having entered the delimited space together. For example, the processing circuitry may be configured to store the association if two transformed re-identification code with the same timestamp and same location information indication an entrance of the delimited space are detected during the matching of the transformed re-identification codes. The processing circuitry may be configured to retrieve the transformed re-identification code representing the second person based on the transformed re-identification code of the first person and based on the stored association. For example, the association may be stored together with the two tuples comprising the two transformed re-identification codes. The processing circuitry may be configured to locate the second person based on the retrieved transformed re-identification code of the second person. For example, the processing circuitry may be configured to retrieve the newest transformed re-identification code from the tuple comprising transformed re-identification codes representing the second person, and to obtain the location information associated with said transformed re-identification code.

To search the tuples of re-identification code, the transformed re-identification code of the first person may be generated. For example, the processing circuitry may be configured to generate a transformed re-identification code based on further media data representing a person, e.g., the second person. This transformed re-identification code may then be used to retrieve the transformed re-identification code of the second person. Alternatively, this transformed re-identification code may be used to locate the person within the delimited space based on the determined sequence of locations associated with the transformed re-identification codes of a tuple comprising transformed re-identification codes that are similar to the generated transformed re-identification code. As such, an image of a missing person may suffice for location the person within the delimited space. Alternatively, not the location of said person may be determined, but the media data that the respective transformed re-identification codes are based on may be retrieved.

In some examples, the system may be used for complying with another part of the privacy laws and regulations. In many situations, privacy laws and regulations may allow a customer to ask for all the video material recorded by a store in which the customer is present. Such a request usually results in a massive amount of manual work where the store owner has to go through the video material for the given day. Using re-id (not necessarily anonymous re-id), it may be possible to create a system that carries out this process automatically. For example, the processing circuitry may be configured to compile the media data that the transformed re-identification codes of the tuple comprising transformed re-identification codes that are similar to the generated transformed re-identification code is based on. For example, each transformed re-identification code may be associated with information on the media data that the transformed re-identification code is based on, which may be used to retrieve the media data. Alternatively, the media data may be retrieved based on the time stamp and location information associated with the respective transformed re-identification codes.

In the previous sections, some applications of the proposed concept have been introduced. They all have in common that the one or more sequences of locations are being analyzed, and information on the persons, animals or objects being represented by the respective re-identification codes is compiled (i.e., the result of the analysis). Once the information is compiled, it may be provided by the evaluation device. In other words, the processing circuitry is configured to provide the information on the one or more sequences of locations. In general, the information on the one or more sequences may comprise the result of any of the above applications, e.g., the statistical information, the information on the time spans, the location of persons, or the retrieved media data.

In general, the information on the one or more sequences of locations may be provided as visualization of the results. In other words, the processing circuitry may be configured to generate a display signal comprising a visualization of the information on the one or more sequences of locations. In general, the display signal may be a control signal for a monitor or display, comprising control instructions that cause the monitor or display to show the visualization. Alternatively, the display signal may be any kind of digital signal comprising the visualization. In particular, the display signal may comprise interpretable code for generating the visualization on a display device. For example, the display signal may comprise interpretable code for generating the visualization in a web browser of a computing device. For example, the visualization may show a result of the re-identification being performed by the evaluation device 10.

There are various types of results that can be visualized. For example, the evaluation device may be configured to determine the time spans associated with the sequences of locations for different persons, animals or vehicles, between two distinct locations using transformed re-identification codes that are generated based on image data of a sensor at each endpoint. Accordingly, the visualization may show a visual representation of the time spans of different persons, animals or vehicles, and/or statistical evaluations thereof.

Alternatively or additionally, the evaluation device may be configured to filter duplicate detections when counting unique visitors at a particular location during a single day based on the transformed re-identification codes. The visualization may show a visual representation of the count of the (filtered) unique visitors at that particular location, and/or statistical evaluations thereof, such as a histogram over time.

In some examples, the evaluation device may be configured to calculate the time of stay of customers at a single location based on the transformed re-identification codes (e.g., using the time spans associated with the sequences of locations). Accordingly, the visualization may show a visual representation of the time of stay of the customers at that location, and/or statistical evaluations thereof, such as a histogram.

FIG. 1*d* shows an example of a visualization provided by an evaluation device. In FIG. 1*d*, the visualization shows anonymized store statistics, and comprises two portions—a first portion 160 comprising textual information, such as the number of unique visitors and the median length of stay, and a second portion 165 with a histogram regarding the length of stay, with the histogram being generated on four-minute time intervals in FIG. 1*d* (with the intervals being at least 1 and at most 5 minutes, more than 5 minutes and at most 9 minutes, more than 9 minutes and at most 13 minutes etc.).

The evaluation device may be configured to perform wide-area people tracking using non-overlapping cameras based on the transformed re-identification codes. For example, both two-dimensional images and three-dimensional representations of the persons may be used for the tracking. Correspondingly, the visualization may show a visual representation of the tracked people. FIG. 1*e* shows another example of a visualization provided by an evaluation device. In FIG. 1*e*, an anonymized in-store customer flow 170. In the visualization, two separate customer flows (#1 and #2) are shown, which lead, along the two or more locations, from an entrance to an exit.

To summarize, the proposed concept uses an (anonymous) re-id system for generating (transformed) re-identification codes. On top of this, multi-camera tracking can be carried out, by recording time-stamped re-id codes for each camera. All events may be exported to a common database for all cameras. On top of the database, various analytics applications can then be created. Various aspects of the evaluation device relate to the multi-camera tracking, and, optionally, to the analytics applications, while the apparatus presented in FIGS. 2*a* to 2*b* relates to the generation of transformed re-identification codes. The specialized analytics application may tailor the product to special use cases.

The interface 12 may correspond to one or more inputs and/or outputs for receiving and/or transmitting information, which may be in digital (bit) values according to a specified code, within a module, between modules or between modules of different entities. For example, the interface 12 may comprise interface circuitry configured to receive and/or transmit information. For example, the interface 12 may be suitable for communication within the camera device 200. Additionally or alternatively, the interface 12 may be suitable for communicating via a computer network, e.g., via a wireless or wired computer network.

The processing circuitry 14 may be implemented using one or more processing units, one or more processing devices, any means for processing, such as a processor, a computer or a programmable hardware component being operable with accordingly adapted software. In other words, the described function of the processing circuitry 14 may as well be implemented in software, which is then executed on one or more programmable hardware components. Such hardware components may comprise a general-purpose processor, such as a Central Processing Unit (CPU) a Digital Signal Processor (DSP), a micro-controller, etc.

In at least some embodiments, the one or more storage devices 16 may comprise at least one element of the group of a computer readable storage medium, such as an magnetic or optical storage medium, e.g., a hard disk drive, a flash memory, Floppy-Disk, Random Access Memory (RAM), a Read Only Memory (ROM), Programmable Read Only Memory (PROM), Erasable Programmable Read Only Memory (EPROM), an Electronically Erasable Programmable Read Only Memory (EEPROM), or a network storage.

More details and aspects of the evaluation device, evaluation method and corresponding computer program are mentioned in connection with the proposed concept or one or more examples described above or below (e.g., FIGS. 2*a* to 3*b*). The evaluation device, evaluation method and corresponding computer program may comprise one or more additional optional features corresponding to one or more aspects of the proposed concept or one or more examples described above or below.

Figure 2A:
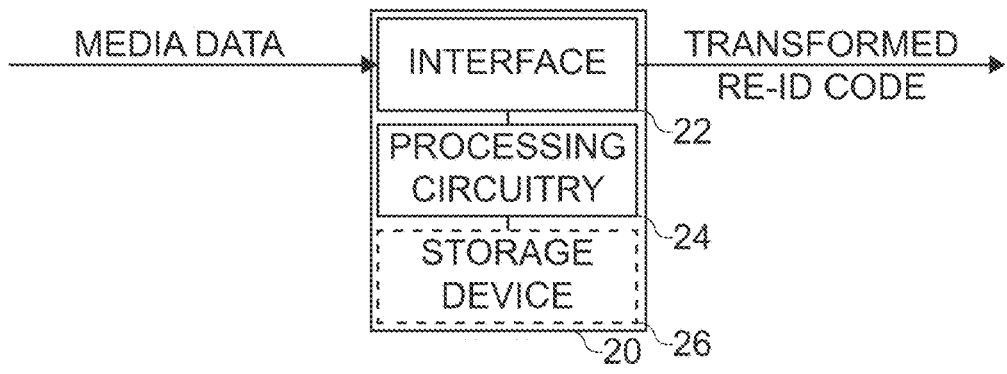
FIGS. 2*a* and 2*b* show schematic block diagrams of examples of an apparatus for re-identification or an apparatus for generating a transformed re-identification code.
Figure 2B:
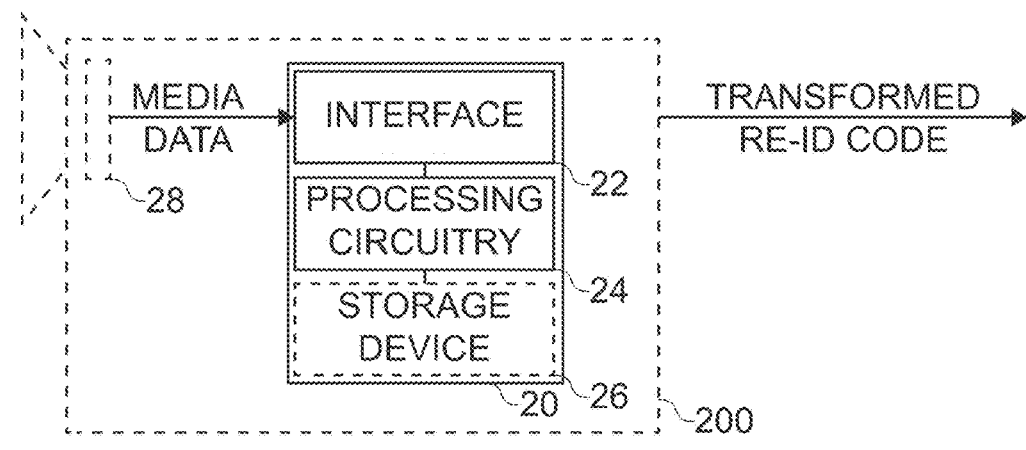

FIGS. 2*a* and 2*b* show schematic block diagrams of examples of an apparatus 20 for re-identification or of an apparatus 20 for generating a transformed re-identification code. The apparatus comprises an interface 22 and processing circuitry 24. Optionally, the apparatus comprises one or more storage devices 26. The processing circuitry is coupled to the interface and to the optional one or more storage devices. In general, the functionality of the apparatus is provided by the processing circuitry, e.g., in conjunction with the interface (for exchanging information) and/or the one or more storage devices (for storing information).

The processing circuitry 24 is configured to obtain media data via an interface 22. The processing circuitry is configured to generate a re-identification code representing at least a portion of the media data using a hashing algorithm. The processing circuitry is configured to transform the re-identification code using a transformation functionality to obtain a transformed re-identification code. The transformation functionality is configured to transform the re-identification code such that, if the re-identification code is similar to a further re-identification code generated by the hashing algorithm according to a similarity metric, the transformed re-identification code is similar to a further transformed re-identification code being a transformed version of the further re-identification code. The transformation functionality is configured to transform the re-identification code based on a transformation parameter. For example, the transformation parameter may be dependent on a time and/or a location. The processing circuitry is configured to provide the transformed re-identification code (e.g., via the interface 22). FIG. 2b further shows a camera device 200 comprising the apparatus 22. For example, the camera device 200 may further comprise an imaging sensor for generating the media data, e.g., as image data.

Various aspects of the present disclosure relate to an apparatus for re-identification, i.e., an apparatus for generating re-identification codes for use in a re-identification system. In contrast to various other systems, the present apparatus builds upon the general concept of re-identification, adding a transformation layer that retains the ability for re-identification while thwarting the ability to retroactively track persons or objects across time or across different locations. For example, by transforming the re-identification code, the re-identification code may be encrypted by the transformation functionality. Various aspects of the present disclosure thus relate to an apparatus for anonymous re-identification.

The proposed concept addresses this issue by adding on top of an existing re-identification function a dynamically changing encryption layer (i.e., a transformation function) that maintains the ECP property. Put differently, the proposed concept allows construction of re-identification codes with built-in time intervals (or location restrictions) outside which they purposefully do not function. This approach results in an anonymous re-identification and privacy-by-design, so re-identification values may be transferred even to insecure devices or over insecure networks and the re-identification code matching process may take place at a later point in time by an untrusted server or even third party. In general, the proposed concept is based on (dynamically) changing the re-identification scheme in an efficient way, e.g., every day or across locations, so that re-identification codes are not consistent between different days and/or locations while still preserving their consistency during each individual day or within each location.

In general, the anonymous re-identification is implemented using at least two novel aspects—a transformation of re-identification codes that preserves the equivalence class preserving property, and a dependency of the transformation on a time or on a location. The first aspect is aimed at retaining the re-identification functionality only between transformed re-identification codes that originate from the same (or similar) transformation parameter, and the second aspect is aimed at specifying the circumstances, in which different transformation parameters are being used. For example, if different transformation parameters are being used for different times, a tracking of a person across the different times may be thwarted. Similarly, if different transformation parameters are being used for different locations, a tracking of a person across the different locations may be thwarted. In consequence, the resulting transformed re-identification codes may be stored and/or transmitted over potentially insecure systems, reducing an implementation effort required.

The re-identification code is generated based on media data. In general, the media data may be visual, audio, or audio-visual media data. For example, the media data may be one of image data, video data, audio data, a three-dimensional representation of movement of an object (i.e., three-dimensional body movement) and text-based media data/input. The media data may accordingly originate from various types of media data generation devices, such as cameras or camera sensors, microphones, three-dimensional scanners or text acquisition systems.

The processing circuitry may be configured to obtain the media data from one or more media data generation device, e.g., locally or via a (computer network). Accordingly, the interface 22 may be or comprise a local interface for intra-device communication, or the interface 22 may be or comprise an interface for communicating via a computer network, such as the internet or a local network. For example, in some cases, the apparatus may be used to generate re-identification code for media data from more than one media data generation device, with the media data generation devices being located at different locations. Accordingly, the media data may be obtained, or may originate, from two or more media data generation devices being located at different locations.

For example, as has been mentioned above, the apparatus may be part of a camera device 200 comprising a camera sensor 28. This case, the media data generation device may be the camera device or the camera sensor 28 of the camera device, and the processing circuitry may obtain the media data from the camera sensor 28. In some cases, however, the apparatus may be external to the camera device, with the processing circuitry being configured to obtain the media data from the camera that is external to the apparatus. For example, the apparatus may be implemented in network device, an edge device (i.e., a network device being located in close proximity to the media data generation devices), or a cloud server. In both cases, in general terms, the processing circuitry is configured to obtain the media data from an imaging sensor of a camera, with the media data being one of image data and video data.

Depending on the type of the media data, a suitable hashing algorithm may be chosen to generate the re-identification code. The processing circuitry is configured to generate the re-identification code representing at least a portion of the media data using the hashing algorithm, with the hashing algorithm being suitable for the media data at hand. The proposed system can also be used beyond people re-identification. For example, the proposed concept may be applied to bicyclists, cars, luggage and other objects or animals. For example, Ye et al: "Deep Learning for Person Re-identification: A Survey and Outlook" (2020) provides examples for hashing algorithms for re-identification that are based on deep learning. Accordingly, the processing circuitry may be configured to use a machine-learning model, e.g., a deep learning network, to generate the re-identification code. Instead of using a previously used re-identification system, newer techniques may also be employed, or the re-identification system may be improved to work with the (dynamic) encryption primitive.

There are various types of re-identification codes. In the following, the given examples assume a hash-value based re-identification code. In particular, examples are given, where the re-identification code is a vector comprising 128 values. However, other types of re-identification codes may be used as well, with a suitable adaption of the transformation functionality.

The re-identification code represents at least a portion of the media data. For example, the re-identification code may represent an object or person represented by the media data. Accordingly, the transformed re-identification code may represent the object or person represented by the media data To carry out the above-mentioned process without periodically having to reconstruct the entire basic re-identification system, which would be a highly laborious process, an extra layer, i.e., the transformation function, is added on top of an existing re-identification system. Accordingly, the processing circuitry is configured to transform the re-identification code (that is generated using an existing or novel re-identification system/algorithm) using a transformation functionality to obtain the transformed re-identification code. The additional layer of the transformation functionality may, for example, be a key-dependent dynamic encryption primitive with the ECP property, which allows the re-identification property to be maintained in spite of re-identification codes being encrypted (in contrast to classical encryption schemes, as mentioned, which lose the re-identification property).

In mathematical terms, $f$ denotes an existing (traditional) re-identification system, that is used to generate the re-identification code. According to a pre-defined schedule, e.g., every day, or per location, a new secret key k is distributed to all devices (using, e.g., a traditional public key infrastructure). For example, the secret key k may be the transformation parameter, or k may be a cryptographic secret the transformation parameter is derived from. Let $e_k$ be a cryptographically secure, bijective transformation function with the ECP property, which is dependent on the shared secret key k. The final anonymous, dynamic re-identification function, $c_k$, which is proposed and which operates on the image I, is then given by the composition of the dynamic encryption layer ex and the existing re-identification function, $f$, i.e., $c_k(I)=e_k(f(I))$.

In the following, the assumption is made that the secret key is changed every day, i.e., that the transformation function is based on time. Let $k_{t-1}$ denote the secret key from yesterday and let $k_t$ denote the secret key from today. Every day, all devices may make sure that the key from yesterday $k_{t-1}$ and thus the corresponding encryption function is securely destroyed (e.g., by overwriting the relevant memory and storage areas). Because keys are changed every day, it may be impossible to compare re-identification codes from yesterday with the re-identification codes from today. In other words, the following anonymous re-identification property is satisfied:

$$ck_t(I_1) \approx ck_t(I_2) \text{ and } ck_{t+1}(I_1) \approx ck_{t+1}(I_2)$$

but $$ck_t(I_1) \neq ck_{t+1}(I_2) \text{ and } ck_t(I_2) \neq ck_{t+1}(I_1).$$

In other words, the similarity-preserving or equivalence class preserving property is satisfied. Hence, the transformation functionality is configured to transform the re-identification code such that, if the re-identification code is similar to a further re-identification code generated by the hashing algorithm according to the similarity metric, the transformed re-identification code is similar to a further transformed re-identification code being a transformed version of the further re-identification code. On the other hand, if the re-identification code is dissimilar to the further re-identification code generated by the hashing algorithm according to the similarity metric, the transformed re-identification code should be, or rather is, dissimilar to the further transformed re-identification code. In more general terms, the transformation functionality may be configured to transform the re-identification code such, that a level of similarity between the re-identification code and the further re-identification code is equivalent to a level of similarity between the transformed re-identification code and the further transformed re-identification code, with the level of similarity being based on the similarity metric. For example, if the level of similarity is high, the two re-identification codes and the two transformed re-identification codes may be similar, respectively, and if the level similarity is low, the two re-identification codes and the two transformed re-identification codes may be dissimilar, respectively.

In various examples, the transformation function can be used to linearly transform the re-identification code. In other words, the transformation functionality may be configured to perform a linear transformation of the re-identification code based on the transformation parameter. One specific implementation of a linear transformation is a transformation that is based on a rotation matrix. In other words, the transformation functionality may be configured to transform the re-identification code using a rotation matrix, with the rotation matrix being based on the transformation parameter. In general, a rotation matrix is a matrix that is used to perform a rotation (e.g., of a vector) in a given coordinate space, by multiplying the vector with the rotation matrix.

In the following, a specific construction of a dynamical encryption function with the ECP property is introduced. It may be assumed for simplicity in the following that the original re-identification code h is a vector of 128 floating point values each from the interval $-1$ to $+1$. In general, the assumptions of using 128-dimensional vectors with float-based components can be changed to any dimension and other numerical domains, e.g., integer or Boolean values. As encryption function being used for the transformation functionality, ex is chosen, the function given by $e_k(h)=R_k \times h$, where $R_k$ is a 128·128 random rotation matrix irreversibly dependent on the key k and where the operation $\times$ denotes the matrix product. Because rotations are distance preserving, the resulting function still has the ECP property required to keep the re-identification process working. $R_k$ can be generated in a cryptographically secure way by initializing a secure random number generator using k, and subsequently sampling a random 128D rotation matrix (e.g., by sampling individual matrix components from the normal distribution using a cryptographically secure random number generator and subsequently normalizing the matrix by carrying out a Gram-Schmidt orthogonalization). In other words, the entries of the rotation matrix may be based on pseudo-random numbers that are derived from the transformation parameter, for example from a cryptographic secret of the transformation parameter. Subsequently, the generated pseudo-random numbers of the matrix may be normalized using Gram-Schmidt orthogonalization. For example, the processing circuitry may be configured to generate the rotation matrix based on the transformation parameter, by generating the pseudo-random numbers and normalizing the resulting matrix. Because of the high number of free parameters in the encryption operator matrix and because of the cryptographically strong construction process, using even a linear operator like $R_k$ can provide sufficient security in most plausible attack scenarios.

Alternatively, the transformation functionality may be configured to perform a non-linear transformation of the re-identification code. For example, instead of a matrix multiplication, a more complex hash function may be employed. In some implementations, deep learning may be employed to create a more complex, more non-linear function (while still maintaining the equivalence class preserving property). In other words, the transformation functionality may be configured to perform the non-linear transformation using a machine-learning model. For example, the machine-learning model may take the re-identification code and the transformation parameter as an input, and provide the transformed re-identification code at an output. The training of a suitable machine-learning model is described in more detail in connection with FIGS. 4a and 4b. Furthermore, end-to-end training of the combined deep network (the underlying re-identification system combined with the dynamic encryption scheme) may be used to enable higher robustness and precision.

In general, to thwart tracking of persons or objects over time and/or location, the transformation parameter, and therefore the transformation itself, is dependent on time and/or location. In general, the time may refer to the time the transformation of the re-identification code is performed, which may also be the time the media data is obtained, as the apparatus may be used for near-instantaneous generation and transformation of the re-identification code. In some cases, the two instances of time may be uncoupled, e.g., the transformation may be applied retroactively on previously generated media data. On the other hand, the location may relate to a location the media originates from (e.g., in a system where one apparatus is used to generate transformed re-identification codes for media data from different media data generation devices located at different locations), or to a location of the apparatus itself, e.g., if the media data of different media data generation devices is to be processed using the same transformation parameter, or of the apparatus is co-located with the media data generation device.

In the following, an implementation of a transformation parameter that is dependent on the time is introduced, followed by an introduction of a transformation parameter that is dependent on location.

Various examples of the present disclosure may use a transformation parameter that changes over time, e.g., in order to avoid re-identification, and therefore the danger of absolute identification, across days. Accordingly, the transformation parameter may be adapted based on a time schedule, in order to apply a new or adapted transformation parameter over time. In other words, the processing circuitry may be configured to adapt the transformation parameter according to a pre-defined time schedule. For example, the processing circuitry may be configured to adapt the transformation parameter every day, or every half-day, or every week, depending on the desired level of privacy. For example, the processing circuitry may be configured to generate, or select, a new transformation parameter according to the pre-defined time schedule. After adapting the transformation parameter, the previously used parameter may be discarded, or rather deleted, in order to thwart a retroactive re-generation of the transformed re-identification codes. In other words, the processing circuitry may be configured to delete a previously used transformation parameter after adapting the transformation parameter. For example, if transformation parameters, or the underlying cryptographic keys, are periodically destroyed, it may not be possible either to obtain the original re-identification codes from prior days even in the event that a device happens to be compromised at some point in time. The resulting transformed re-identification codes can therefore freely be shared with anyone without compromising the identify of anyone thus providing anonymous re-identification codes.

In some examples, incremental/differential key changes may be employed in the transformation function. For example, if the transformation function depends on time, this would result in a sliding temporal window of anonymization instead of the current fixed window from, e.g., midnight to midnight. In other words, the processing circuitry may be configured to generate two transformation parameters for two points in time (e.g., midnight at two days). These two transformation parameters may be sufficiently different to disable tracking of persons or objects across the two transformation parameters. The processing circuitry may be configured to gradually adapt the transformation parameter based on a linear interpolation between the two transformation parameters in between the two points in time. In other words, between the two points in time, the transformation parameter being used for transforming the re-identification code may be gradually adapted based on a linear interpolation from a first of the two transformation parameters to a second of the two transformation parameters. Taken the rotation matrix as an example, a first and a second rotation matrix each having a plurality of elements may be generated. Using linear interpolation, a third rotation matrix may be generated, wherein each element of the third matrix is based on a linear interpolation between the respective elements of the first and second matrix. Subsequently, the third matrix may be normalized.

Similarly, incremental/differential key changes may be used across various locations of an area. The further apart the locations within the area are the less similar the resulting re-identification codes may be. For example, as introduced above, the processing circuitry may be configured to obtain the media data from two or more media data generation devices being located at different locations. In general, the processing circuitry may be configured to perform the transformation using different transformation parameters for the two or more media data generation devices being located at different locations, e.g., in order to disable re-identification between transformed re-identification codes being generated for the media data originating from the two locations. A third media data generation device, however, may be located between the two media data generation devices. The transformation parameter for this third media data generation device may be chosen such, that re-identification is possible vis-à-vis transformed re-identification codes that are generated for media data originating from the first two locations. In other words, the processing circuitry may be configured to obtain the media data from a first, a second and a third media data generation device being located at different locations, with the second media data generation device being located between the first and the third media data generation device. Similar to the example with the gradual adaptation over time, the processing circuitry may be configured to generate the transformation parameter for the media data obtained from the second media data generation device based on a linear interpolation between transformation parameters used for the media data obtained from the first and third media data generation devices. As a result, re-identification may be possible between transformed re-identification codes generated based on media data originating from the first and the second media data generation device, and between transformed re-identification codes generated based on media data originating from the second and the third media data generation device, but not between transformed re-identification codes generated based on media data originating from the first and the third media data generation device. In various examples, an even more fine-granular system may be used, where the two transformation parameters are generated for two arbitrary locations located at either side of a group of media data generation devices, and the transformation parameters of the media data generation devices are generated based on a location-based linear interpolation between the two transformation parameters.

In general, there are various options for obtaining the suitable transformation parameters. For example, the transformation parameters may be generated on-device, i.e., by the processing circuitry, based on a cryptographic secret, which may be shared among apparatuses being configured to generate the same transformation parameters (e.g., dependent on time). In other words, the transformation parameter may be derived from a cryptographic secret.

Accordingly, the processing circuitry may be configured to generate the transformation parameter, e.g., the rotation matrix, or an input parameter for the machine-learning model being employed by the transformation functionality, based on the cryptographic secret and based on the time and/or the location. For example, the cryptographic secret may be used, together with the time and/or location, to generate a seed for generating pseudo-random numbers for the transformation parameter. For example, a cryptographically strong method may be used for constructing new keys (i.e., transformation parameters) or encryption methods from a single shared secret. Irreversible key generation may be used for heightened security. For example, in some examples, irreversible, shared, dynamic transformation parameters (i.e., key values) may be used without a persistent network connection. After sharing an initial secret seed, the following method may be applied: $k_t = AES(k_{t-1}, k_{t-1})$, where the operation AES (x, k) applies the Advanced Encryption Standard to the text x using the key (i.e., cryptographic secret) k, i.e., to obtain today's key, $k_t$, yesterday's key, $k_{t-1}$, may be encrypted with itself and subsequently destroyed.

Finally, the processing circuitry is configured to provide the transformed re-identification code, e.g., via the interface 22. In general, the processing circuitry may be provided by storing the re-identification code, e.g., using the one or more storage devices, or using a database, e.g., a database that is accessible by multiple devices via a defined interface (e.g., via a computer network and/or according to a pre-defined protocol), and/or that is external to the apparatus and/or the camera device. In other words, the processing circuitry may be configured to provide the transformed re-identification code to a database. For example, the transformed re-identification code may be processed by an evaluation device that has access to the database.

The proposed concept may provide a combination of computer vision and cryptography. Specifically, privacy-enhanced visual person re-identification may be provided, using secure video analysis on distributed, embedded camera-based systems.

The interface 22 may correspond to one or more inputs and/or outputs for receiving and/or transmitting information, which may be in digital (bit) values according to a specified code, within a module, between modules or between modules of different entities. For example, the interface 22 may comprise interface circuitry configured to receive and/or transmit information. For example, the interface 22 may be suitable for communication within the camera device 200. Additionally or alternatively, the interface 22 may be suitable for communicating via a computer network, e.g., via a wireless or wired computer network.

The processing circuitry 24 may be implemented using one or more processing units, one or more processing devices, any means for processing, such as a processor, a computer or a programmable hardware component being operable with accordingly adapted software. In other words, the described function of the processing circuitry 24 may as well be implemented in software, which is then executed on one or more programmable hardware components. Such hardware components may comprise a general-purpose processor, such as a Central Processing Unit (CPU) a Digital Signal Processor (DSP), a micro-controller, etc.

In at least some embodiments, the one or more storage devices 26 may comprise at least one element of the group of a computer readable storage medium, such as an magnetic or optical storage medium, e.g., a hard disk drive, a flash memory, Floppy-Disk, Random Access Memory (RAM), a Read Only Memory (ROM), Programmable Read Only Memory (PROM), Erasable Programmable Read Only Memory (EPROM), an Electronically Erasable Programmable Read Only Memory (EEPROM), or a network storage.

More details and aspects of the camera device or of the method, apparatus and computer program introduced in connection with FIGS. 2a to 2b are mentioned in connection with the proposed concept or one or more examples described above or below (e.g., FIGS. 1a and 1e, 3a to 3b). The camera device and the method, apparatus and computer program may comprise one or more additional optional features corresponding to one or more aspects of the proposed concept or one or more examples described above or below.

Figure 3B:
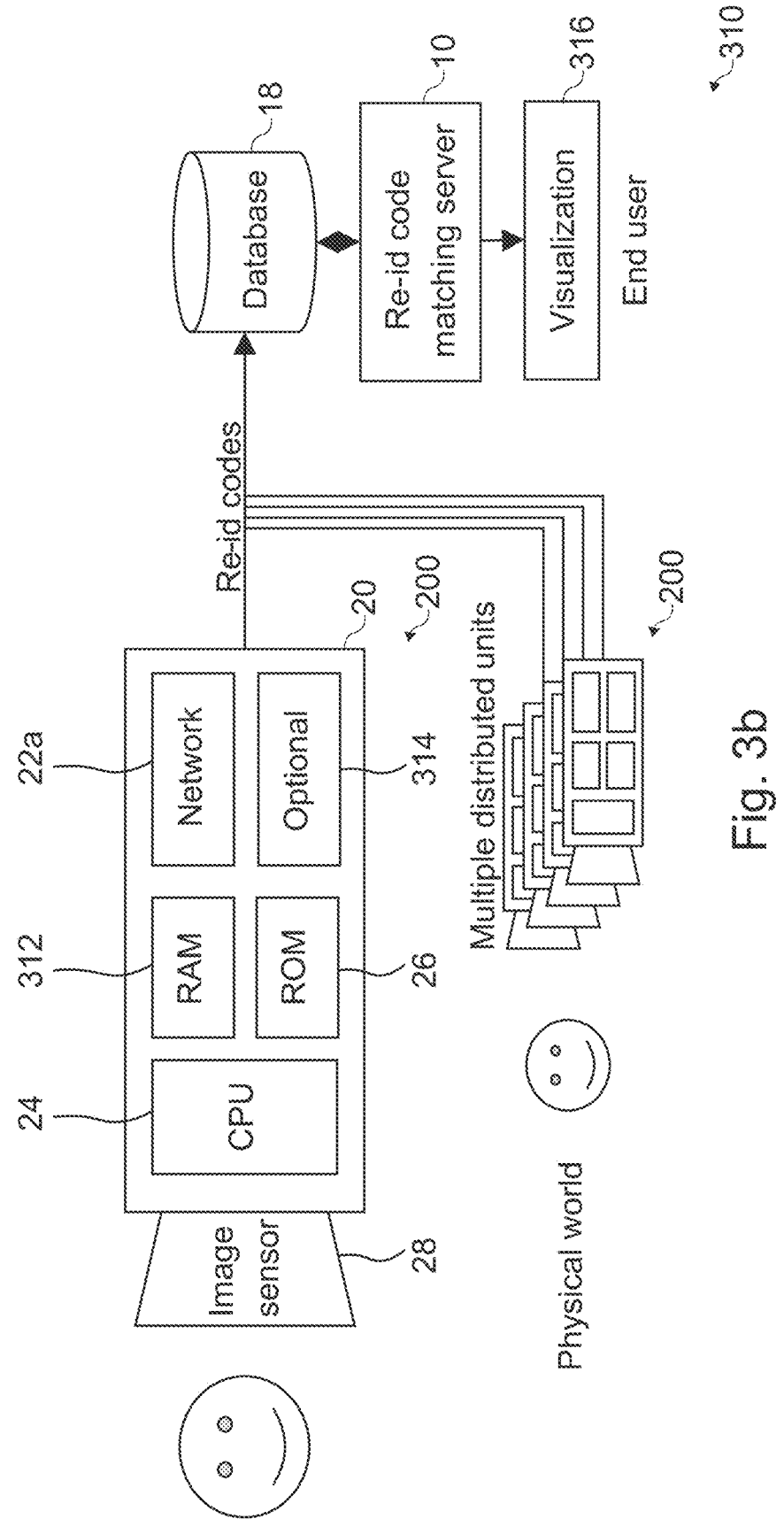

FIGS. 3a and 3b show schematic block diagrams of examples of systems 300; 310 comprising at least one apparatus 20 for re-identification or at least one apparatus 20 for generating a transformed re-identification code. While the apparatus for generating and transforming the re-identification codes is introduced in connection with FIGS. 2a to 2b, FIGS. 3a to 3b show the context, in which the apparatus can be used. In general, the system may comprise a single apparatus 20, e.g., as part of a camera device 200. The system 300 of FIG. 3a, as shown, comprises two camera devices 200 (or more general, two media data generation devices 200) each comprising an apparatus 20. The system 310 of FIG. 3b comprises a plurality of camera devices 200 each comprising an apparatus 20. In other words, the system 300; 310 comprise two or more apparatuses 20. As shown in FIG. 3b, the apparatus 20 may comprise one or more additional components, such as Random-Access Memory (RAM) 312 or one or more optional components 314. The apparatus 20 shown in FIG. 3b comprises a network interface 22a, which may be a part of the interface 22 introduced in connection with FIGS. 2a and 2b.

In addition to the apparatus 20, or a camera device with the apparatus 20, the system may optionally comprise an evaluation device 10, e.g. the evaluation device of FIGS. 1a to 1e, which may be used to perform the re-identification using the transformed re-identification codes. In other words, the systems shown in FIGS. 3a and 3b comprise an evaluation device 10 with a database 18 (e.g., the database introduced in connection with FIGS. 2a to 2b), which is coupled to the apparatuses 20. As shown in FIG. 3b, the evaluation device 10 may be implemented as a re-identification code matching server 10, which may communicate with the database 18. The evaluation device may be configured to obtain transformed re-identification codes from the at least one apparatus 20, and to compare the transformed re-identification codes provided by the at least one apparatus according to the similarity metric. For example, the evaluation device may be configured to obtain the transformed re-identification codes from the at least one apparatus 20 via the database 18. In general, the evaluation may be configured to perform re-identification based on the transformed re-identification codes of the apparatuses. In general, the evaluation device 10 may be external to the apparatuses 20. In some examples, however, one of the apparatuses may comprise the evaluation device 10. As shown in FIG. 3b, the evaluation device 10 may provide a visualization 316 to the end user, e.g., as shown in connection with FIGS. 1a to 1e.

Depending on whether the transformation parameter being used by the apparatus or apparatuses is dependent on time or location, different criteria may be satisfied by the transformation parameters being used. For example, the transformation parameter is dependent on a time (i.e., a current time at the apparatus). The two or more apparatuses may be configured to use the same transformation parameter at the same time, e.g., such that transformed re-identification codes being generated at the same time are suitable for being used for re-identification.

On the other hand, if the transformation parameter is dependent on the location, the transformation parameter may be different depending on the location that the respective media data has originated from. In other words, the one or more (or two or more apparatuses) may be configured to process media data originating from two or more locations, and to use different transformation parameters for the media data originating from the two or more locations, as has been described in connection with FIGS. 2a to 2b. Additionally, a gradual adaptation of the transformation parameter based on the respective location the media data has originated from may also be applied, e.g., in a scenario with three or more media data generation devices.

More details and aspects of the system are mentioned in connection with the proposed concept or one or more examples described above or below (e.g., FIG. 1a to 2b). The system may comprise one or more additional optional features corresponding to one or more aspects of the proposed concept or one or more examples described above or below.

The proposed concept relates in general to computer vision, machine learning, people counting, in-store analytics, and/or people flow monitoring.

The aspects and features described in relation to a particular one of the previous examples may also be combined with one or more of the further examples to replace an identical or similar feature of that further example or to additionally introduce the features into the further example.

Examples may further be or relate to a (computer) program including a program code to execute one or more of the above methods when the program is executed on a computer, processor or other programmable hardware component. Thus, steps, operations or processes of different ones of the methods described above may also be executed by programmed computers, processors or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F) PLAs), (field) programmable gate arrays ((F) PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

What is claimed is:

1. A system for re-identification comprising,
a plurality of camera devices, and
an evaluation device;
each camera device of the plurality of camera devices comprising an imaging sensor and processing circuitry configured to:
obtain media data via the imaging sensor;
generate a re-identification code representing at least a portion of the media data;
transform the re-identification code using a similarity-preserving transformation based on a transformation parameter that is dependent upon time, to obtain a transformed re-identification code;
associate the transformed re-identification code with a timestamp and location information; and
provide the transformed re-identification code, the timestamp, and the location information to the evaluation device, and
the evaluation device comprising processing circuitry being configured to:
obtain a plurality of transformed re-identification codes from the plurality of camera devices,
match transformed re-identification codes among the plurality of transformed re-identification codes using a similarity metric to generate one or more tuples of transformed re-identification codes that are similar according to the similarity metric;

determine one or more sequences of locations associated with the transformed re-identification codes of the one or more tuples of transformed re-identification codes based on the timestamps and location information associated with the transformed re-identification codes of the respective tuple; and provide information on the one or more sequences of locations, where in each camera device of the plurality of camera devices is located in a different location.

2. The system of claim 1, wherein the processing circuitry of the evaluation device is configured to determine information on time spans associated with the one or more sequences of locations based on the timestamps associated with the transformed re-identification codes of the one or more tuples of transformed re-identification codes.

3. The system of claim 1, wherein each camera device of the plurality of camera devices is configured to capture media data in a non-overlapping field of view with other camera devices of the plurality of camera devices.

4. The system of claim 1, wherein the processing circuitry of the evaluation device is further configured to generate a display signal comprising a visualization of the information on the one or more sequences of locations.

5. The system of claim 1, wherein the re-identification code is generated using a hashing algorithm.

\* \* \* \* \*